United States Patent
Sasaki et al.

(10) Patent No.: US 8,064,596 B2
(45) Date of Patent: Nov. 22, 2011

(54) STREAM CONTROL DEVICE, STREAM ENCRYPTION/DECRYPTION DEVICE, AND STREAM ENCRYPTION/DECRYPTION METHOD

(75) Inventors: Takatsuna Sasaki, Kanagawa (JP); Kaoru Yanamoto, Kanagawa (JP)

(73) Assignee: Sony Corportion, Tokyo (JP)

( * ) Notice: Subject to any disclaimer, the term of this patent is extended or adjusted under 35 U.S.C. 154(b) by 993 days.

(21) Appl. No.: 11/437,252

(22) Filed: May 19, 2006

(65) Prior Publication Data
US 2006/0291648 A1 Dec. 28, 2006

(30) Foreign Application Priority Data
Jun. 1, 2005 (JP) ................ 2005-161687

(51) Int. Cl.
*H04K 1/00* (2006.01)
*H04L 9/00* (2006.01)

(52) U.S. Cl. ............... 380/37; 380/29; 380/42

(58) Field of Classification Search .......... 380/37, 380/29, 42
See application file for complete search history.

(56) References Cited

U.S. PATENT DOCUMENTS

| | | | | |
|---|---|---|---|---|
| 5,504,816 A * | 4/1996 | Hamilton et al. | ............. | 380/217 |
| 6,101,599 A * | 8/2000 | Wright et al. | ............. | 712/228 |
| 6,119,215 A * | 9/2000 | Key et al. | ............. | 712/19 |
| 6,418,478 B1 * | 7/2002 | Ignatius et al. | ............. | 709/240 |
| 6,519,194 B2 * | 2/2003 | Tsujino et al. | ............. | 365/201 |
| 6,643,719 B1 * | 11/2003 | Baker | ............. | 710/57 |
| 6,792,002 B2 * | 9/2004 | Tezuka et al. | ............. | 370/474 |
| 6,877,048 B2 * | 4/2005 | Bilak et al. | ............. | 710/52 |
| 7,130,426 B1 * | 10/2006 | Cha et al. | ............. | 380/201 |
| 7,401,154 B2 * | 7/2008 | Ignatius et al. | ............. | 709/232 |
| 7,409,562 B2 * | 8/2008 | Kahn et al. | ............. | 713/194 |
| 7,502,470 B2 * | 3/2009 | Hanko et al. | ............. | 380/200 |
| 7,512,780 B1 * | 3/2009 | Milliken | ............. | 713/153 |
| 7,606,364 B1 * | 10/2009 | Shih | ............. | 380/42 |
| 7,933,412 B2 * | 4/2011 | Kugumiya et al. | ............. | 380/258 |
| 7,970,163 B2 * | 6/2011 | Nakama | ............. | 382/100 |
| 2001/0042209 A1 * | 11/2001 | Sato | ............. | 713/190 |
| 2002/0085551 A1 * | 7/2002 | Tzeng | ............. | 370/389 |
| 2002/0150248 A1 * | 10/2002 | Kovacevic | ............. | 380/210 |
| 2002/0159460 A1 * | 10/2002 | Carrafiello et al. | ............. | 370/392 |
| 2003/0046580 A1 * | 3/2003 | Taniguchi et al. | ............. | 713/200 |
| 2003/0059047 A1 * | 3/2003 | Iwamura | ............. | 380/201 |
| 2003/0108205 A1 * | 6/2003 | Joyner et al. | ............. | 380/277 |
| 2003/0118189 A1 * | 6/2003 | Ibi et al. | ............. | 380/277 |
| 2004/0030655 A1 * | 2/2004 | Tanaka et al. | ............. | 705/56 |
| 2004/0170152 A1 * | 9/2004 | Nagao et al. | ............. | 370/338 |
| 2004/0184479 A1 * | 9/2004 | Yamauchi et al. | ............. | 370/466 |
| 2005/0047404 A1 * | 3/2005 | Kim et al. | ............. | 370/382 |
| 2005/0177713 A1 * | 8/2005 | Sim | ............. | 713/151 |
| 2005/0201559 A1 | 9/2005 | Van Der Heijden | | |
| 2006/0090011 A1 * | 4/2006 | Nakama | ............. | 709/246 |
| 2006/0188172 A1 * | 8/2006 | Higurashi et al. | ............. | 382/275 |

FOREIGN PATENT DOCUMENTS

JP    01-245326    9/1989

(Continued)

*Primary Examiner* — Michael Pyzocha
(74) *Attorney, Agent, or Firm* — Robert J. Depke; Rockey, Depke & Lyons, LLC

(57) ABSTRACT

The present invention provides a stream control device. The device includes a plurality of data processors that sequentially implement processing for stream data. The unit data of processing in each of the data processors has a certain data amount. The stream control device also includes a memory that is provided at a previous stage or a subsequent stage of the data processor, and stores the stream data. Each of the data processors includes a monitoring unit that monitors an amount of data stored in the memories at a previous stage and a subsequent stage of the data processor, and a data retriever that retrieves data to be processed from the memory at the previous stage.

5 Claims, 4 Drawing Sheets

FOREIGN PATENT DOCUMENTS

| | | |
|---|---|---|
| JP | 04-326654 | 11/1992 |
| JP | 08-065170 | 3/1996 |
| JP | 2000-020398 | 1/2000 |
| JP | 2000-059234 | 2/2000 |
| JP | 2002-009864 | 1/2002 |
| JP | 2003-281085 | 10/2003 |
| JP | 2003-281086 | 10/2003 |
| JP | 2003-303469 | 10/2003 |
| JP | 2004-295692 | 10/2004 |

* cited by examiner

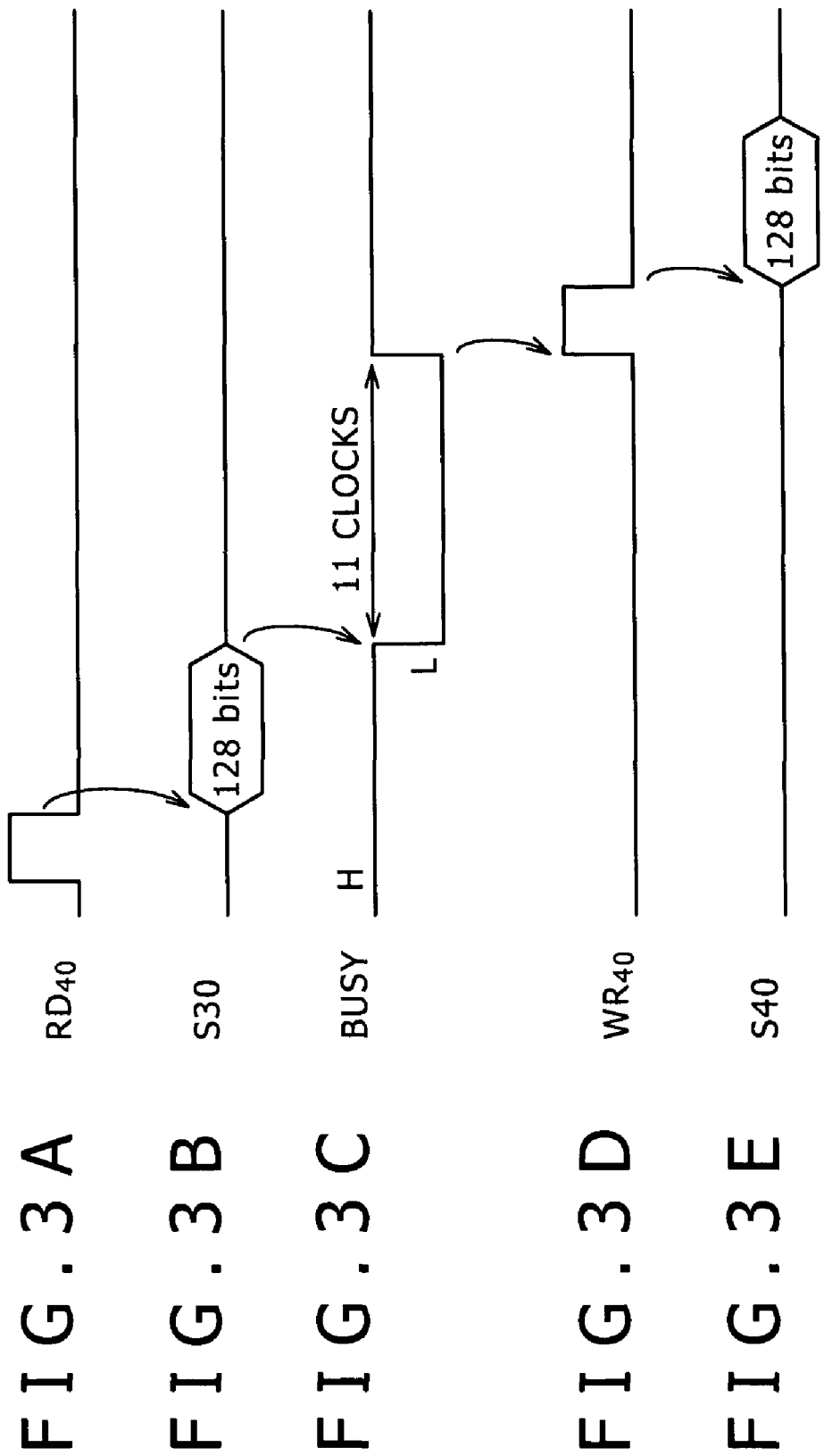

STREAM CONTROL DEVICE, STREAM ENCRYPTION/DECRYPTION DEVICE, AND STREAM ENCRYPTION/DECRYPTION METHOD

CROSS REFERENCE TO RELATED APPLICATIONS

The present invention contains subject matter related to Japanese Patent Application JP 2005-161687 filed in the Japanese Patent Office on Jun. 1, 2005, the entire contents of which being incorporated herein by reference.

BACKGROUND OF THE INVENTION

1. Field of the Invention

The present invention relates to stream control techniques for controlling packet-based streams composed of multiplexed video and audio, such as MPEG (Moving Picture Experts Group) streams, and particularly to a stream control technique in implementing multiple times of encryption/decryption for streams.

2. Description of Related Art

In step with recent spread of data communication networks, so-called home networks are being diffused in the home so that home appliances, computers, and other peripheral apparatuses are coupled via a network to allow communication among the apparatuses. In the home network, the communication among the network-coupled apparatuses allows sharing of data processing functions of the respective apparatuses. The home networks offer users convenience and comfort. For example, users are allowed to transfer content among network-coupled apparatuses. Therefore, it is anticipated that the home networks will become more popular in the future.

Digital transmission content protection (DTCP) is known as the de facto standard of a technique for protecting content copyrights in the home networks. In the DTCP, a content sender and a content receiver verify each other and exchange an encryption key to share it, so that encrypted data is transferred therebetween.

In many cases, plural apparatuses coupled to a home network employ not a single scheme of encryption/decryption but a plurality of schemes of encryption/decryption. For example, the DTCP/IP for developing the DTCP on an IP network employs advanced encryption standard (AES) of which key length is 128 bits as a standard. In contrast, recording of data in a medium such as a hard disk drive (HDD) employs data encryption standard (DES), of which cipher strength is lower than that of the AES.

In this manner, different multiple schemes of encryption/decryption are employed in the home network, and buffers (memories) that temporarily store stream data as content are provided among encryption/decryption processors. For example, Japanese Patent Laid-open No. 2003-281085 discloses a technique in which encrypted/decrypted data is transferred via memories as buffers.

SUMMARY OF THE INVENTION

In data processing methods in related art like one disclosed in this patent, when encryption is carried out for example, transfer of the encrypted and encrypted data is limited (transfer wait) depending on the amounts of data stored in the buffers at the previous stage and the subsequent stage of the encryption processing block (see e.g. FIG. 17 in the above-described patent document).

However, typically the amount of data for encryption processing is different for each encryption scheme. Therefore, if multiple times of encryption are carried out under plural encryption schemes, there is a need to control the timings at which streams (stream data) as encryption targets are input to the respective encryption processing blocks. That is, there is a need to provide a buffer control circuit that controls buffers compatibly with the plural encryption schemes.

Accordingly, the buffer control circuit needs to be varied every time when the encryption scheme of a part of the plural encryption processing blocks is changed, or a further additional encryption processing block is provided, which precludes flexible construction of the encryption processing system in a home network. For example, in the encryption processing blocks, the data width of processing-target data and the processing time therefor are different depending upon the encryption scheme. Therefore, changes of the encryption schemes have an effect on various processing of the buffer control circuit, such as serial-to-parallel and parallel-to-serial conversions between upstream and downstream buffers, and internal register processing.

The present invention is made in consideration of the above viewpoints. It is desirable to provide a stream control device, a stream encryption/decryption device, and a stream encryption/decryption method. According to these devices and the method, a change of a data processing scheme has no effect on memory control in a system for transferring data via memories among processing blocks that subject streams to data processing, such as encryption/decryption processing, based on plural data processing schemes that have different data amounts of the unit data of the processing and different processing time periods for the processing of the unit data.

According to an embodiment of the present invention for addressing the above-described problem, a stream control device includes a plurality of data processors that sequentially implement processing for stream data. The unit data of processing in each of the data processors has a certain data amount. The stream control device also includes a memory that is provided at the previous stage or the subsequent stage of the data processor, and stores the stream data. Each of the data processors has a monitoring unit that monitors the amount of data stored in the memories at the previous stage and the subsequent stage of the data processor, and a data retriever that retrieves data to be processed from the memory at the previous stage, if data is stored in the memory at the previous stage and the free space in the memory at the subsequent stage is equal to or larger than the data amount of the unit data of processing in the data processor.

According to an embodiment of the present invention for addressing the above-described problem, a stream encryption/decryption device includes a plurality of encryptor/decryptors that sequentially implement encryption/decryption for stream data. The unit data of encryption/decryption in each of the encryptor/decryptors has a certain data amount. The stream encryption/decryption device also includes a memory that is provided at the previous stage or the subsequent stage of the encryptor/decryptor, and stores the stream data. Each of the encryptor/decryptors has a monitoring unit that monitors the amount of data stored in the memories at the previous stage and the subsequent stage of the encryptor/decryptor, and a data retriever that retrieves data to be encrypted/decrypted from the memory at the previous stage, if data is stored in the memory at the previous stage and the free space in the memory at the subsequent stage is equal to or larger than the data amount of the unit data of encryption/decryption in the encryptor/decryptor.

According to an embodiment of the present invention for addressing the above-described problem, a stream encryption/decryption method implements a plurality of times of encryption/decryption for stream data. The unit data of each encryption/decryption has a certain data amount. The method includes four steps. The first step monitors the data amount of data that is to be subjected to Nth (N is an integer) encryption/decryption and is stored in an Nth memory. The second step monitors the data amount of data that has been subjected to the Nth encryption/decryption and is stored in an N+1th memory. The third step retrieves data to be encrypted/decrypted from the Nth memory, if data is stored in the Nth memory and the free space in the N+1th memory is equal to or larger than the data amount of the unit data of the Nth encryption/decryption. The fourth step implements the Nth encryption/decryption for the retrieved data.

According to an embodiment of the present invention, a change of a data processing scheme has no effect on memory control in a system for transferring data via memories among processing blocks that subject streams to data processing, such as encryption/decryption processing, based on plural data processing schemes that have different data amounts of the unit data of the processing and different processing time periods for the processing of the unit data.

BRIEF DESCRIPTION OF THE DRAWINGS

FIGS. 3A to 3E indicate a timing chart showing the operation of the AES processor.

DETAILED DESCRIPTION OF THE PREFERRED EMBODIMENTS

Embodiments of the present invention will be described below in association with the accompanying drawings.

First Embodiment

A stream encryption/decryption device 1 according to a first embodiment of the invention will be described below in association with FIG. 1.

Typically, in a home network system, encryption is carried out for MPEG transport stream data (hereinafter, appropriately abbreviated as a stream) as video content in order to protect the copyright of the video content.

In the DTCP/IP, the AES with a key length of 128 bits is employed as a standard, and streams are transferred in an ether cable after being AES-encrypted. In contrast, when a stream is recorded in a medium such as a HDD, the DES, of which cipher strength is lower than that of the AES, is employed.

Therefore, in stream transfer over current home networks, plural schemes of encryption/decryption are implemented.

Figure 1:
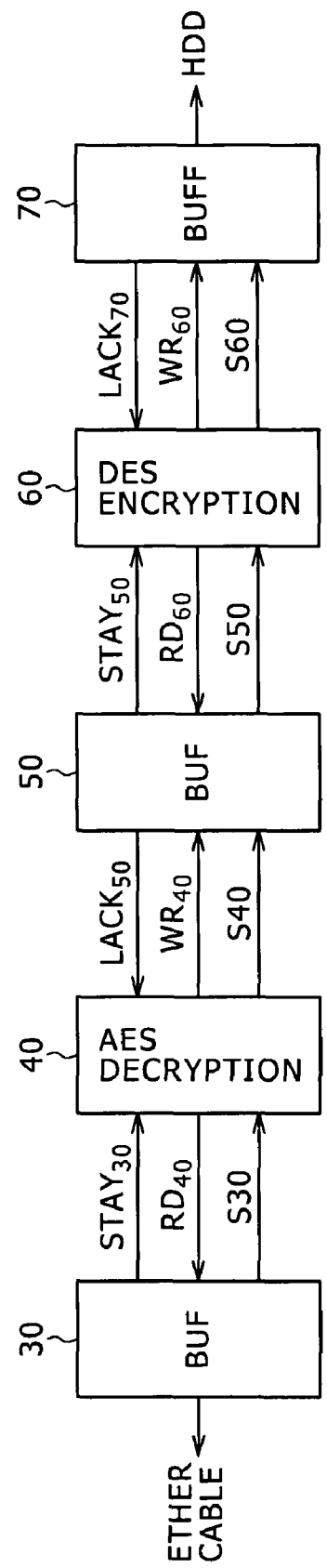
FIG. 1 is a diagram illustrating a block configuration of a stream encryption/decryption device according to one embodiment of the present invention.

The stream encryption/decryption device 1 shown in FIG. 1 is to implement plural schemes of encryption/decryption in a home network system. Specifically, the device 1 loads therein an AES-encrypted stream on an ether cable, decrypts the stream, and then implements DES encryption to record the stream in a HDD.

The stream encryption/decryption device 1 according to the first embodiment includes a plurality of encryptor/decryptors and a plurality of memories. As the plurality of encryptor/decryptors, an AES processor 40 and a DES processor 60 are included. As the plurality of memories, buffers (BUF) 30, 50, and 70 are included.

Referring to FIG. 1, a stream is loaded in the buffer 30 from an ether cable (not shown) after being AES-encrypted, and is recorded in a HDD from the buffer 70. That is, the stream is transferred in one direction from the buffer 30 to the buffer 70.

In general, the data amount of the unit data of encryption processing and the processing time for encryption of the unit data are different depending on encryption schemes. For example, in AES encryption, encryption is implemented on per 128-bit data basis, and the processing time for the encryption of the 128-bit data is 11 clocks. In DES encryption, encryption is implemented on per 64-bit data basis, and the processing time for the encryption of the 64-bit data is 18 clocks.

Therefore, when multiple times of encryption/decryption are implemented under plural schemes, buffers for temporarily storing transport streams are provided at the previous stage and the subsequent stage of each encryptor/decryptor as shown in FIG. 1.

The configuration of the stream encryption/decryption device 1 will be described below.

The buffer 30 stores encrypted data transferred through the ether cable. In response to a read instruction $RD_{40}$ from the AES processor 40, encrypted data S30 is retrieved by the AES processor 40.

The AES processor 40 monitors the amounts of data stored in the buffers 30 and 50 adjacent to the AES processor 40. Specifically, the AES processor 40 acquires a stored-data amount $STAY_{30}$ of the buffer 30 and a free space $LACK_{50}$ in the buffer 50 every predetermined time, e.g., every one clock. Depending upon the stored-data amount $STAY_{30}$ and the free space $LACK_{50}$, the AES processor 40 sends the read instruction $RD_{40}$ to the buffer 30. The retrieval of data from the buffer 30 is carried out on per 128-bit data basis.

The AES processor 40 completes AES decryption processing in 11 clocks. Immediately after the completion, the AES processor 40 provides the buffer 50 with a write instruction $WR_{40}$, and transfers data S40 of 128 bits as the unit data.

The buffer 50 exists between the AES processor 40 and the DES processor 60.

Data S50 stored in the buffer 50 is retrieved by the DES processor 60 in response to a read instruction $RD_{60}$.

The DES processor 60 monitors the amounts of data stored in the buffers 50 and 70 adjacent to the DES processor 60. Specifically, the DES processor 60 acquires a stored-data amount $STAY_{50}$ of the buffer 50 and a free space $LACK_{70}$ in the buffer 70 every predetermined time, e.g., every one clock. Depending upon the stored-data amount $STAY_{50}$ and the free space $LACK_{70}$, the DES processor 60 sends the read instruction $RD_{60}$ to the buffer 50. The retrieval of data from the buffer 50 is carried out on per 64-bit data basis.

The DES processor 60 completes DES encryption processing in 18 clocks. Immediately after the completion, the DES processor 60 provides the buffer 70 with a write instruction $WR_{60}$, and transfers data S60.

As described above, in the stream encryption/decryption device 1, the AES processor 40 and the DES processor 60 actively control the buffers through the read instructions RD and the write instructions WR.

A description will be made on the configuration of the AES processor 40 in the stream encryption/decryption device 1 of the first embodiment. The configurations of the AES processor 40 and the DES processor 60 are identical to each other, except that encryption processing and decryption processing are different.

Figure 2:
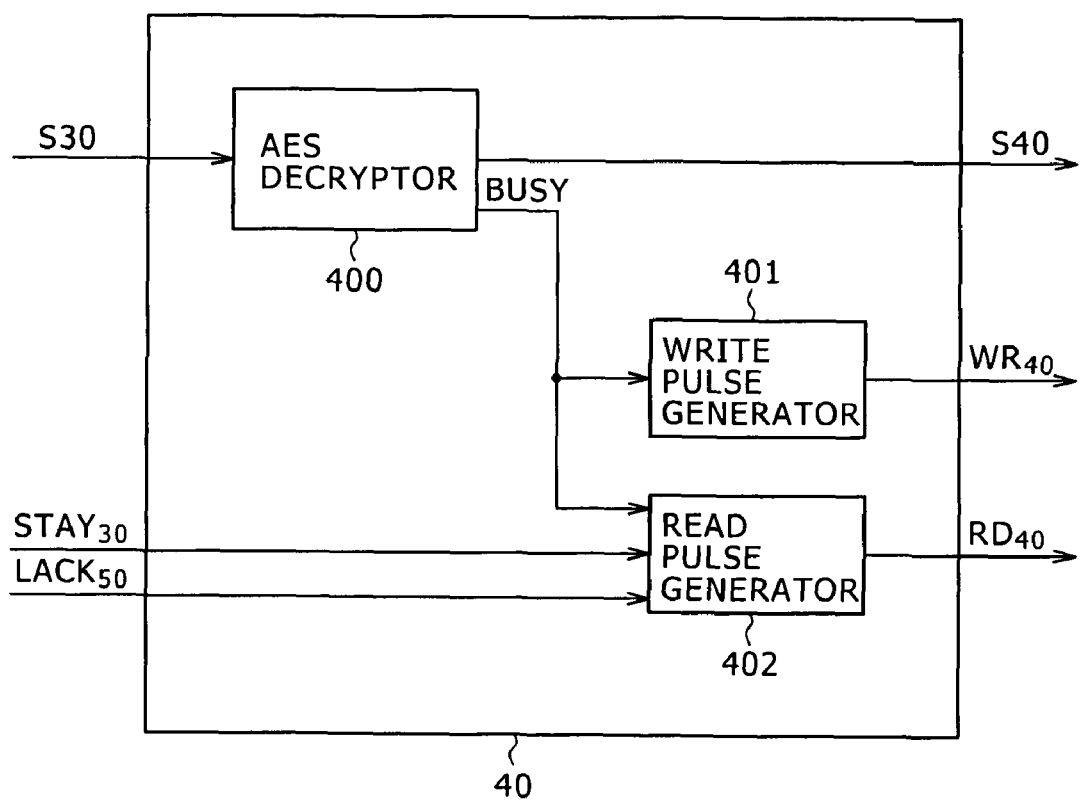
FIG. 2 is a block diagram illustrating a specific configuration example of an AES processor.

FIG. 2 is a block diagram illustrating a specific configuration example of the AES processor 40.

Referring to FIG. 2, the AES processor 40 includes an AES decryptor 400, a write pulse generator 401, and a read pulse generator 402.

The AES decryptor 400 implements serial-to-parallel conversion processing, AES decryption processing, and parallel-to-serial conversion processing. Specifically, the AES decryptor 400 loads therein the data S30 as a serial signal from the buffer 30, and executes serial-to-parallel conversion processing therefor to thereby produce 128-bit unit data. Subsequently, the AES decryptor 400 implements AES decryption processing, and then executes parallel-to-serial conversion processing for the decrypted data so that the data S40 as a serial signal is produced.

The AES decryption processing is executed in a fixed period of 11 clocks. During the decryption period, the encrypted data S30 is not loaded in the AES decryptor 400.

When the AES decryption processing is being carried out, the AES decryptor 400 sets a state signal BUSY (low active) at the low level. When the AES decryptor 400 is not executing the AES decryption processing, the state signal BUSY is at the high level.

The write pulse generator 401 detects a transition of the state signal BUSY from the low level to the high level, and then supplies the write instruction WR$_{40}$ to the subsequent-stage buffer 50. Thus, upon the completion of the AES decryption processing, the data S40 as the decryption result is immediately supplied to the buffer 50.

The read pulse generator 402 loads therein the stored-data amount STAY$_{30}$ of the buffer 30, the free space LACK$_{50}$ in the buffer 50, and the state signal BUSY, and supplies the read instruction RD$_{40}$ to the previous-stage buffer 30. Specifically, the read pulse generator 402 supplies the read instruction RD$_{40}$ to the previous-stage buffer 30 if both the following conditions (i) and (ii) are satisfied.

The condition (i) is that the stored-data amount STAY$_{30}$ of the previous-stage buffer 30 is at least one byte and the free space LACK$_{50}$ in the subsequent-stage buffer 50 is equal to or larger than 16 bytes (=128 bits)

The condition (ii) is that the state signal BUSY is at the high level.

The AES processor 40 executes AES decryption processing on per 128 bits basis and outputs the 128-bit data S40. The condition (i) therefore needs the subsequent-stage buffer 50 to have capacity for accepting this 128-bit data S40. If the buffer 50 has a free space equal to or larger than 128 bits, as long as data is stored in the previous-stage buffer 30, the AES processor 40 accepts the data. However, when the AES processor 40 is executing AES decryption processing, the acceptance of data from the previous-stage buffer 30 is difficult. Therefore, the condition (ii) needs to be satisfied.

The operation of the AES processor 40 will be described below with reference to FIG. 3.

FIG. 3 is a timing chart showing the operation of the AES processor 40. FIGS. 3A, 3B, 3C, 3D, and 3E indicate the read instruction RD$_{40}$, the data S30, the state signal BUSY, the write instruction WR$_{40}$, and the data S40, respectively.

Initially, the read pulse generator 402 changes the signal of the read instruction RD$_{40}$ from the low level to the high level as shown in FIG. 3A, provided that the stored-data amount STAY$_{30}$ of the previous-stage buffer 30 is at least one byte and the free space LACK$_{50}$ in the subsequent-stage buffer 50 is equal to or larger than 16 bytes (=128 bits). Thus, a read instruction is issued to the previous-stage buffer 30. In response to this read instruction, the encrypted data S30 of 128 bits is transmitted from the buffer 30 as shown in FIG. 3B.

Upon the completion of loading of the 128-bit encrypted data S30, the AES decryptor 400 changes the state signal BUSY from the high level to the low level, and implements AES decryption processing for the loaded data as shown in FIG. 3C. Upon the completion of the AES decryption processing, the AES decryptor 400 returns the state signal BUSY to the high level, to thereby set the ready state in which the subsequent 128-bit encrypted data S30 can be loaded from the buffer 30. The time period it takes for the 128-bit encrypted data to be AES-decrypted is fixed at 11 clocks. This processing time is defined by the encryption scheme.

Subsequently, the write pulse generator 401 detects the transition of the state signal BUSY from the low level to the high level, and then changes the signal of the write instruction WR$_{40}$ from the low level to the high level as shown in FIG. 3D. Thus, a write instruction is issued to the subsequent-stage buffer 50. In response to this write instruction, the decrypted data S40 of 128 bits is transmitted to the buffer 50 as shown in FIG. 3E.

The above-described series of processing is sequentially carried out on per 128-bit data basis.

The above-described configuration and operation of the AES processor 40 also apply to the DES processor 60 similarly. Specifically, the DES processor 60 monitors the amounts of data stored in the buffers 50 and 70, and issues a read instruction to the buffer 50 according to the monitoring result.

Accordingly, the operation of the entire stream encryption/decryption device 1 shown in FIG. 1 is as follows.

For example, when writing of data to the HDD is stagnant and therefore the buffer 70 has little free space, the DES processor 60 is difficult to read data from the buffer 50, and thus accumulation of the data S40 processed by the AES processor 40 in the buffer 50 proceeds. The progression of the accumulation in the buffer 50 results in little free space in the buffer 50, which precludes the AES processor 40 from retrieving data from the buffer 30.

As writing of data to the HDD sequentially proceeds, the free space in the buffer 70 increases, and therefore the DES processor 60 becomes capable of reading data from the buffer 50. This leads to an increase of the free space in the buffer 50, which allows the AES processor 40 to retrieve data from the buffer 30.

That is, in the stream encryption/decryption device 1, the buffer from which stored data is transferred sequentially changes from the buffer 70, which is at the most downstream in the data flow, to the buffer 50 and the buffer 30.

The stream encryption/decryption device 1 of the present embodiment can offer the following advantages.

Specifically, in a system including a plurality of encryption/decryption processors such as the AES processor 40 and the DES processor 60, each encryption/decryption processor monitors the amounts of data stored in the previous- and subsequent-stage buffers, and issues a data-read instruction to the previous-stage buffer based on the monitoring result. Therefore, even when an encryption/decryption scheme is changed or added, reconstruction of the system is allowed without changing the buffers.

For example, the data amounts of the unit data treated in one processing operation are 128 bits in the AES, 64 bits in the DES, and 64 bits in Triple-DES. Thus, a change of an encryption/decryption scheme involves a change of the data amount of the unit data treated in one processing operation. However, only changing the above-described condition (i), which is the condition for issuing a read instruction, depending on the changed encryption/decryption scheme can address this data amount change, and there is no need to change processing of buffers.

Furthermore, the processing time periods for encryption/decryption of the unit data are 11 clocks in the AES, 18 clocks in the DES, and 54 clocks in the Triple-DES. Thus, a change of an encryption/decryption scheme involves a change of the processing time. However, the processing is determined based on the above-described condition (ii), which is the condition for issuing a read instruction, irrespective of the encryption/decryption scheme, and there is no need to change processing of buffers.

As described above, by providing the stream encryption/decryption device 1 for a home network, a system that continuously subjects streams to encryption/decryption processing can be constructed flexibly according to application.

Second Embodiment

A stream encryption/decryption method according to a second embodiment of the invention will be described below.

Figure 4A:
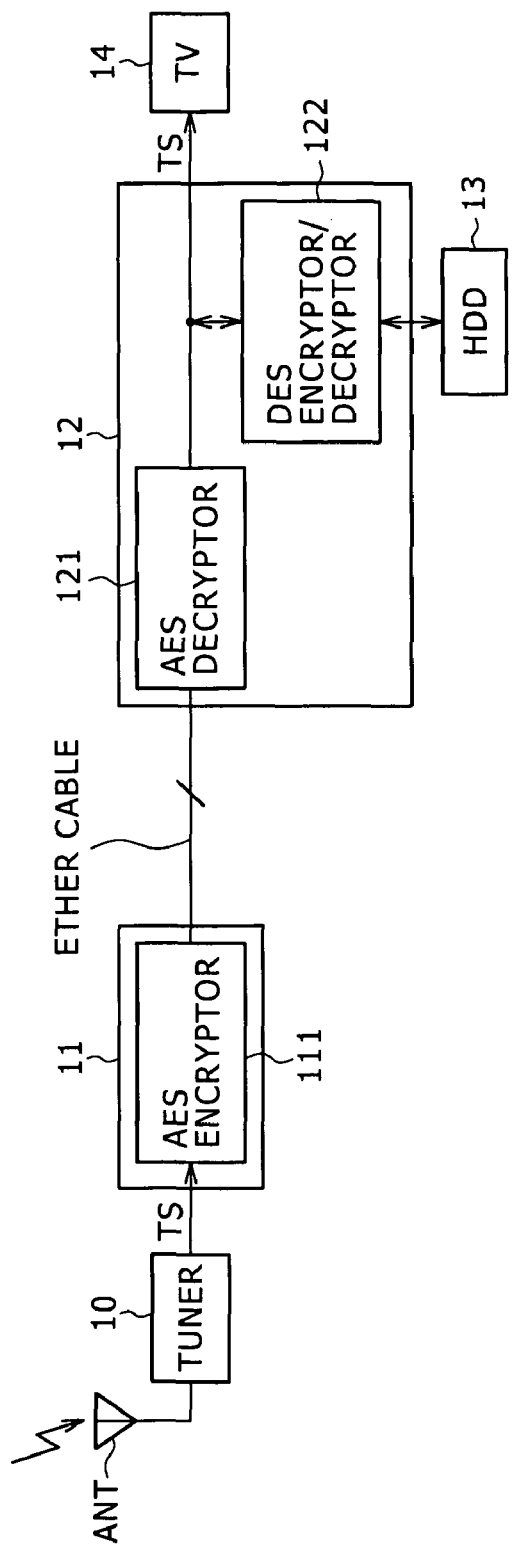
FIGS. 4A and 4B are diagrams illustrating examples of a home network system to which a stream encryption/decryption method according to an embodiment of the invention is applied.
Figure 4B:
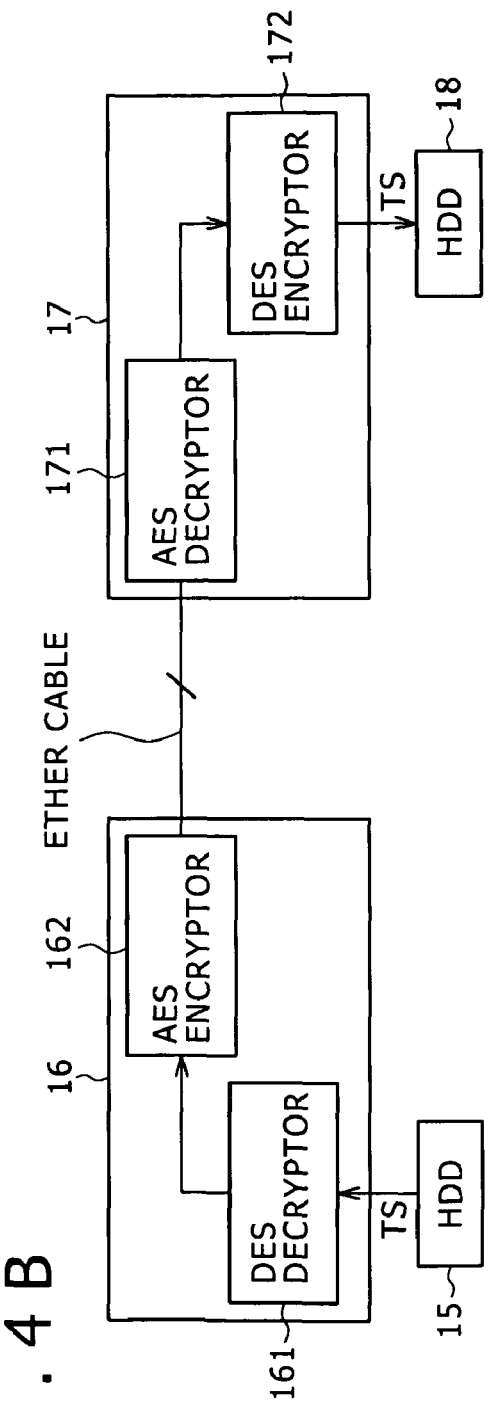

FIGS. 4A and 4B are diagrams illustrating examples of a home network system to which the stream encryption/decryption method according to the second embodiment is applied.

Referring to FIG. 4A, an antenna (ANT) receives broadcast waves and a tuner 10 selects therefrom radio waves with a desired frequency, so that video content as a MPEG transport stream (TS) is extracted. This TS is AES-encrypted by an AES encryptor 111 in a stream processor 11, followed by being transmitted to an ether cable. The AES-encrypted data is AES-decrypted by an AES decryptor 121 in a stream processor 12, and the decrypted TS is reproduced by a TV set 14.

In addition, the TS that is AES-decrypted by the AES decryptor 121 in the stream processor 12 is DES-encrypted by a DES encryptor/decryptor 122 and is stored in a HDD 13 according to need. The TS in the HDD 13 is DES-decrypted by the DES encryptor/decryptor 122 and is reproduced by the TV set 14 in response to operation of the apparatus by a user.

FIG. 4B illustrates a configuration example of a system for transferring video content stored in one HDD 15 to another HDD 18.

Referring to FIG. 4B, a TS stored in the HDD 15 is DES-decrypted by a DES decryptor 161 in a stream processor 16, and then is AES-encrypted by an AES encryptor 162, followed by being sent to an ether cable. The AES-encrypted data is AES-decrypted by an AES decryptor 171 in a stream processor 17, and then is DES-encrypted by a DES encryptor 172, followed by being stored in the HDD 18.

As described above, when an encryption scheme is different, typically the unit data of encryption processing and the processing time for encryption of the unit data are also different. Therefore, when multiple times of encryption/decryption are carried out under plural schemes, buffers (not shown in FIGS. 4A and 4B) for temporarily storing a TS are provided at the previous stage and the subsequent stage of each encryptor/decryptor.

Therefore, the configurations of the home network systems shown in FIGS. 4A and 4B are the same as that of the stream encryption/decryption device 1 according to the first embodiment, in that plural encryptor/decryptors are provided and each encryptor/decryptor is provided with previous-stage and subsequent-stage buffers as plural memories. Thus, the home network systems in FIGS. 4A and 4B can offer the same operations and advantages as those of the first embodiment.

That is, a stream encryption/decryption method in which each encryptor/decryptor monitors the amounts of data stored in its previous-stage and subsequent-stage buffers and issues a data-read instruction to the previous-stage buffer, can be widely applied without being limited by an apparatus.

It should be noted that embodiments of the present invention do not stick to the above-described embodiments but can be variously modified by those skilled in the art without departing from the scope of the invention.

For example, the invention is not limited to the above-described configuration example of the stream encryption/decryption device 1 according to the first embodiment (FIG. 1), which includes two processors that implement encryption/decryption of two schemes and three buffers that are provided at the previous stages and the subsequent stages of the processors. It should be obvious that a configuration implementing encryption/decryption of three or more schemes can also employ the technical idea in which each encryption/decryption processor issues a read instruction depending upon the amounts of data stored in its previous-stage and subsequent-stage buffers, and other ideas.

In addition, the kind of data processing is not limited to encryption/decryption processing. Embodiments of the invention can be applied to a configuration that implements, along one direction, multiple times of data processing as general data processing in which the unit data of processing has a certain data amount.

What is claimed is:

1. A data stream control device comprising:
a plurality of data processors that sequentially implement processing for a stream of data, wherein each data processor processes a specific unit amount of data at a time within a single data network; and
a memory is provided at a previous stage or a subsequent stage data processor, and stores data from the stream data; wherein
each of the data processors having
a monitoring unit that monitors an amount of data stored in memories at a previous stage and/or a subsequent stage data processor, and
a data manager controls the transfer of data to be processed from the memory at the previous stage, if data is stored in the memory at the previous stage and an amount of available memory at the subsequent stage is equal to or larger than the unit amount of data processing to be processed by the data processor, and further wherein the stream control device alters data stream transfer rates in order to optimize data transfer between devices having data encrypted according to first and second different data encryption standards.

2. A stream encryption/decryption device comprising:
a plurality of encryptor/decryptors that sequentially implement encryption/decryption for a stream of data, each of the encryptor/decryptors processes a specific unit amount of data at a time within a single data network; and
a memory that is provided at a previous stage or a subsequent stage encryptor/decryptor, and stores a portion of the stream data; wherein
each of the encryptor/decryptors includes
a monitoring unit that monitors an amount of data stored in a memory at a previous stage and/or a subsequent stage encryptor/decryptor, and
a data manager controls transfer of data to be encrypted/decrypted from the memory at the previous stage, if data is stored in the memory at the previous stage and an available amount of memory at the subsequent stage is equal to or larger than the unit amount of data, and further wherein the stream encryption/decryption device alters data stream transfer rates in order to optimize data transfer between devices having data encrypted according to first and second different data encryption standards.

3. The stream encryption/decryption device according to claim 2, wherein each of the encryptor/decryptors has a processing time period dependent upon an encryption/decryption scheme of the encryptor/decryptor, and transfers retrieved data to the memory at the subsequent stage after elapse of the processing time period.

4. A data stream encryption/decryption method for implementing encryption/decryption for a stream of data, each encryption/decryption unit capable of processing a specific unit amount of data at a time, the method comprising:

monitoring an amount of data that is to be subjected to an Nth (N is an integer) encryption/decryption stage and is stored in a memory within a single data network;

monitoring a data amount that has been subjected to the Nth encryption/decryption stage and is stored in an N+1 th memory;

retrieving data to be encrypted/decrypted from the Nth memory, if data is stored in the Nth memory and an available amount of memory in the N+1 th memory is equal to or larger than a unit amount of data of the Nth encryption/decryption stage; and implementing the Nth encryption/decryption for the retrieved data, and further wherein the data stream encryption/decryption method alters data stream transfer rates in order to optimize data transfer between devices having data encrypted according to first and second different data encryption standards.

5. The data stream encryption/decryption method according to claim 4, further comprising:

transferring the data for which the Nth encryption/decryption stage has been implemented to the N+1 th memory after elapse of a processing time period of the Nth encryption/decryption, the processing time period depending upon an encryption/decryption scheme of the Nth encryption/decryption stage.

* * * * *